2,877,089
ELUTION OF URANIUM FROM RESIN

Daniel C. McLean, Springdale, Conn., assignor, by mesne assignments, to the United States of America as represented by the United States Atomic Energy Commission No Drawing. Application February 9, 1956
Serial No. 564,374

4 Claims. (Cl. 23—14.5)

This invention relates to an improved method of eluting uranium from anion exchange resins.

In the past a number of problems have been presented in the elution of uranium from anion exchange resins. One problem was presented by the reduction in eluting efficiency with build up of sulfate ion until a very high concentration is reached. The second is the problem of removing vanadium and iron where they are present in relatively large quantities on the resin. The first problem has resulted in the past in the necessity for larger and larger volumes of eluant as its eluting efficiency dropped with increase in sulfate ion content. The second difficulty resulted in contamination of the final uranium precipitate with vanadium and iron.

According to the present invention I have found that a large portion of the sulfate ion on the resin is removed by the first small portion of the eluant, for example, the first column volume. Also the eluate produced from this first small portion has an extremely low chloride ion content, most of the chloride ion having been transferred to the resin. This first portion is treated to precipitate uranium as ammonium diuranate which is referred to as "yellow cake," by reason of its color. This is normally effected by neutralization of the very acid colution, for example with ammonia. After filtration, the barren solution containing a large amount of sulfate and very little chloride ion is discarded. The remaining portions of eluant, for example in a typical operation, the remaining 9–13 column volumes are separately treated to precipitate yellow cake and then the barren solution is regenerated for use by adjusting the pH and replacing any lost chloride ion content. No build up of sulfate ion takes place to the point where it seriously affects the efficiency of elution and the values lost by the discarding of the former amount of barren solution are negligible compared to the large losses which are necessary in the ordinary process where barren solution has to be purged containing a high chloride content and where, of course, a much larger proportion of the eluant has to be purged because it is a composite of the various portions with differing sulfate ion concentrations.

The second problem is presented when there is considerable vanadium and iron on the resin. In this case the eluant, at least the first small portion, is chlorinated. The result is a removal in the first small portion of most of the vanadium and iron, together with most of the sulfate. The vanadium and iron contaminate the precipitated yellow cake, it is true, but they contaminate only a relatively small portion, and where separation is to be effected, the cost of separation if applicable only to the yellow cake, which is a very small portion of the total eluate.

Normally both features of the invention will be used in combination where the leach liquor is from a sulfuric acid leach, which is normal, and where there is sufficient iron and vanadium to warrant the saving in purification. However, if leaching is effected with an acid which does not contain any considerable amount of sulfate ion the saving in vanadium recovery cost may still be effected even through no problem is presented by sulfate build up.

It is not necessary to chlorinate all of the eluant. It is sufficient if the first small portion only is chlorinated. Subsequent portions may be of standard $NH_4Cl$-$HCl$ eluant. On the other hand in some situations chlorine may be the cheapest form of obtaining chloride ion and in some cases it is possible to use chlorinated eluant for more of the portions, if not for all of them. Normally, however, it is preferable to introduce the made up chloride ion in the form of HCl or ammonium chloride.

It is an unexpected advantage of the present invention that when chlorinated eluant is used for the first portion, the amount of yellow cake which has to be subjected to purification is smaller and hence purification costs and uranium losses in purification are both decreased. In the present invention, therefore, there is no compromise and the efficiency of the vanadium and iron concentration is obtained with a further increased lowering of cost.

The chlorinated eluant, which is usually obtained by introducing chlorine into an aqueous ammonium hydroxide or acid solution until the desired pH and a chloride ion concentration of approximately 1 N is obtained, probably represents a complex chemical system. It is generally thought that ammonium hypochlorite does not exist, and while the chlorine, oxygen and ammonia proportions sometimes correspond to such a hypothetical compound, it is probable that the solution is a mixture of various compounds such as chloramine and the like. In any event, the chlorinated eluant is effective and the exact chemical constitution is of no importance and it is not intended to limit the present invention to any particular theory of composition.

The invention will be described in greater detail in conjunction with the following specific examples.

Example 1

A chlorinated eluant is prepared by passing chlorine into ammonium hydroxide until the chloride ion content is approximately 1 N and the pH is about 1. One column volume of this eluant is passed through a column containing an anion exchange resin which is saturated with uranium complex by adsorption from a sulfuric acid leach liquor from an ore containing uranium, vanadium and iron. The eluate is neutralized with ammonia until the yellow cake precipitates, filtered and the filtrate discarded since it contains only about 3 g./l. chloride ion and 25 g./l. sulfate ion. The resin was then eluted with 8.3 column volumes of a standard .9 N $NH_4Cl$—.1 N HCl eluant, the eluant neutralized with ammonia to precipitate yellow cake, the cake recovered by filtration and the barren eluate reconstituted by the addition of chloride ion and readjustment to pH 1, HCl being used for this purpose.

The results from three representative runs are shown in the following table.

| Eluate fraction | Column, vols. | Yellow Cake assay, percent | | | Distribution, percent | | |
|---|---|---|---|---|---|---|---|
| | | $U_3O_8$ | $V_2O_5$ | Fe | $U_3O_8$ | $V_2O_5$ | Fe |
| 1st | 1 | 89.3 | 0.47 | 5.08 | 15.6 | 89.1 | 89.6 |
| 2nd | 8.3 | 97.5 | .012 | .12 | 84.4 | 10.9 | 10.4 |
| 1st | 1 | 82.0 | 1.05 | 10.15 | 13.9 | 94.8 | 86.8 |
| 2nd | 9.3 | 96.0 | .012 | .33 | 86.1 | 5.2 | 13.2 |
| 1st | 1 | 81.8 | .97 | 9.72 | 10.7 | 91.7 | 82.2 |
| 2nd | 10 | 98.0 | .012 | .33 | 89.3 | 9.3 | 17.8 |

It will be apparent that an average of over 90% of the vanadium and an average of better than 85% of the iron is to be found in the small amount of yellow cake from the first column volume of the eluate. On the other hand this contains an average of about 13.5% of the uranium, and this small amount of yellow cake is subjected to the conventional purification steps to remove the vanadium and iron. The vanadium treated is small and the percentage of the total uranium is also small, resulting in minimum losses. The yellow cake from the rest of the elution is so high in uranium assay that it requires no special purification.

*Example 2*

The procedure of Example 1 was repeated using standard .9 N $NH_4Cl$—.1 N HCl eluant both for the first column volume and for the subsequent portions. The barren filtrate after yellow cake precipitation from the first column volume averaged slightly over 3.5 g./l. chloride ion and over 40 g./l. sulfate ion and was discarded. The results of two representative runs are shown in the following table.

| Eluate fraction | Column, vols. | Assay, percent | | | Distribution, percent | | |
|---|---|---|---|---|---|---|---|
| | | $U_3O_8$ | $V_2O_5$ | Fe | $U_3O_8$ | $V_2O_5$ | Fe |
| 1st | 1 | 94.3 | .25 | 1.51 | 19.0 | 63.0 | 51.0 |
| 2nd | 10 | 95.3 | .035 | .35 | 81.0 | 37.0 | 49.0 |
| 1st | 1 | 93.0 | .16 | 2.93 | 27.8 | 52.7 | 71.7 |
| 2nd | 10 | 94.6 | .057 | .45 | 72.2 | 47.3 | 28.3 |

It will be noted from the table that while the average uranium recovery of about 23.5% is considerably higher for the first column volume than when the chlorinated eluant is used, the vanadium and iron removal was very much lower. Thus, although these runs show a somewhat higher efficiency from the standpoints of uranium removal without sulfate buildup, the procedure is not as suitable for a resin that is so high in iron and vanadium but would show even greater efficiency from the standpoint of preventing sulfate build up where the resin had lower iron and vanadium content.

*Example 3*

In order to compare the increase of column volumes required as a result of sulfate buildup by the normal elution technique, a series of cycles of elution were run with the standard .9 N $NH_4Cl$—.1 N HCl eluant, regenerating its chloride content and pH after yellow cake precipitation. In each case elution was continued until the concentration of uranium in the last of the eluate was less than .01 g./l. $U_3O_8$. For the first two cycles 10 column volumes of eluate sufficed. The next two cycles required about 12.5 column volumes and the fifth and sixth cycles required slightly over 13 column volumes. When the procedures of Examples 1 and 2 were used, recycling the eluant from the final column volumes after readjustment of chloride ion content and pH, no increase in the total volume of eluant was noted after eight cycles in each case.

Because of the incompletely known composition of the eluant used in the first column volume of Example 1, it will be referred to in the claims as chlorinated $NH_4Cl$—HCl eluant.

I claim:

1. In a process of eluting uranium from an anion exchange resin containing the same by means of an $NH_4Cl$—HCl eluant, the improvement which comprises eluting with a small volume of eluant precipitating uranium as yellow cake by neutralization, filtering, discarding the filtrate, eluting with the remainder of the eluant until minimum uranium content in the eluate is obtained, separately precipitating yellow cake from the second and larger portion of the eluate, separating the yellow cake reconstituting the remaining liquid to original chloride ion content and pH and reusing this liquid for eluting further batches of resin.

2. A process according to claim 1 in which the first small portion of eluant is chlorinated $NH_4Cl$—HCl eluant whereby the yellow cake from said first portion has a very large content of iron and vanadium and the yellow cake from said first portion is subjected to purification by removal of vanadium and iron compounds.

3. A process according to claim 2 in which the first portion of eluant is from about 10% to about 12% of the total eluate volume.

4. A process according to claim 1 in which the first portion of eluant is from about 10% to about 12% of the total eluate volume.

References Cited in the file of this patent
UNITED STATES PATENTS 2,756,123    Bailes et al. _____ July 24, 1956

OTHER REFERENCES

Coleman: ORNL–1500, AEC Document, March 31, 1953, pp. 94, 97.

Kazanjian: ACCO–59, AEC Document, July 29, 1954, pp. 5, 6.

Atomic Energy Commission Document ACCO–68, pp. 25, 38, 39 (1954).